United States Statutory Invention Registration [19]

[11] Reg. Number: H444

Roth et al. [43] Published: Mar. 1, 1988

[54] PROCESS FOR MAKING MOLDED ARTICLES WITH MOLD RELEASE AGENTS

[75] Inventors: Claris D. Roth; Kenneth B. Moser, Decatur, Ill.

[73] Assignee: A. E. Staley Manufacturing Company, Decatur, Ill.

[21] Appl. No.: 735,900

[22] Filed: May 20, 1985

[51] Int. Cl.[4] ..... B29C 49/00; B29C 45/83; B29C 45/00

[52] U.S. Cl. ..... 264/45.1; 264/129; 264/300; 264/328.6

[58] Field of Search ..... 264/300, 338, 54; 156/289

[56] References Cited

U.S. PATENT DOCUMENTS

| | | | |
|---|---|---|---|
| 2,888,409 | 5/1959 | Bender et al. | 521/128 |
| 2,965,615 | 12/1960 | Tess | 525/123 |
| 3,051,687 | 8/1962 | Young et al. | 525/418 |
| 3,055,871 | 9/1962 | Heffler et al. | 528/59 |
| 3,178,490 | 4/1965 | Petrino et al. | 264/41 |
| 3,332,896 | 7/1967 | Burns et al. | 527/302 |
| 3,383,351 | 5/1968 | Stamberger | 524/762 |
| 4,024,088 | 5/1977 | Godlewski | 260/2.5 A |
| 4,223,129 | 9/1960 | Roth et al. | 536/18.6 |
| 4,254,228 | 3/1981 | Kleimann et al. | 521/128 |

FOREIGN PATENT DOCUMENTS 1365215 8/1974 United Kingdom .

OTHER PUBLICATIONS

#167 pp. 720 and 721 J.A.O.C.S., vol. 60, No. 4 (4/1983) "Methyl Glucoside/Triglyceride Alcoholysis Products, Their Preparation & Characterization" by Dean Roth.

*Primary Examiner*—Edward A. Miller
*Assistant Examiner*—J. E. Thomas

[57] ABSTRACT

A glycoside compound containing one or more fatty acid ester or ether groups is used as a mold release agent in the production of molded articles from polymeric resinous materials. Said mold release agent can function as either external or internal mold release agent. The molded article also has improved tie coating properties.

30 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PROCESS FOR MAKING MOLDED ARTICLES WITH MOLD RELEASE AGENTS

BACKGROUND OF THE INVENTION

The present invention relates generally to processes and compositions for making molded articles that have improved properties. The molded articles are made for polymeric resinous materials, and are easily removed from a mold and preferably provide an improved surface for coating. More particularly, it relates to techniques and/or compositions involving the use of a reaction product of a glycoside and a fatty acid source to facilitate removal of molded resin products from molds and, preferably, to also provide an improved tie-coating surface to said molded resin products.

Resins based on various polymers are used in the production of molded objects. In general, such resins must be thermoplastic or thermosetting in order to perform satisfactorily. Examples of thermoplastic resins include polyamides, polyesters, polyurethanes, polypeptides, ether and acetal polymers, polysulfides, polycarbonates, polyolefins, polystyrenes, polyvinyl chlorides, acrylonitrile butadiene styrene resins, acrylic resins, and the like. Examples of thermosetting resins include phenolic resins, amino resins, unsaturated polyester resins, epoxy resins, cross-linked polyurethanes, silicone polymers and similar resins.

Resins based on organic polyisocyanates, as for example, polyurethane products, are well known and enjoy widespread commercial use in reaction injection molding (RIM) applications in which molded resin products are obtained through reaction of polyisocyanates with hydroxyl or amine containing molecules within a mold cavity. Polyurethanes constitute a broad class of polymeric materials having a wide range of physical characteristics. The polymers are produced through the interaction of a polyisocyanate with a chemical compound having two or more active hydrogen atoms in its structure such as a polyol, or polyether/polyester that contains active hydrogen groups in the form of amines, amides or hydroxyls, or mixtures of two or more of such materials. This component used in preparing the polyurethane is generally termed in the art as an "active-hydrogen-containing material" and is generally liquid, or a solid capable of being melted at a relatively low temperature. The materials most typically used contain hydroxyl groups as the radicals having the active hydrogen and thus are generally termed "polyols." The preparation of polyurethanes is disclosed, for example, in U.S. Pat. No. 2,888,409 issued May 26, 1959 and in the patents referred to therein. In addition, other hydroxyl-capped polymers useful as the polyol in preparing polyurethane resins include polyformals as described, for example, in U.S. Pat. No. 3,055,871 issued Sept. 25, 1982 to Heffler et al.; hydroxyl-terminated lactone polyesters described in U.S. Pat. No. 3,051,687 issued Aug. 28, 1962 to Young et al.; and alkylene oxide adducts of the allyl alcohol-styrene polymers described in U.S. Pat. No. 2,965,615 issued Dec. 20, 1960 to Tass, et al. It is conventional to use a polyol as a source of active hydrogen donor in the reaction, see for example, U.S. Pat. No. 3,383,351 issued May 14, 1968 to Stamberger.

Difficulties have occurred in the molding of the polyurethanes because of sticking of the polyurethanes to the molds in which they are produced. This sticking has, in the past, been overcome by the coating of the molds with an external mold-release agent, for example, see U.S. Pat. No. 3,178,490 issued Apr. 13, 1965 to Petrino, et al. However, such coating is expensive and time consuming during molding operations. Further, some of the external mold release agents leave a residue on the surface of the polyurethane which often interferes with the coating applied later.

British Pat. No. 1,365,215 issued Aug. 29, 1974 to Kleimann et al. discloses additives included in foamable reaction mixtures to impart mold parting properties. More particularly, this patent sets forth additives comprising salts of aliphatic carboxylic acids with primary amines, and an ester of a monofunctional and/or polyfunctional carboxylic acid, or a natural or synthetic oil, fat or wax.

The problem of polyurethanes sticking during molding is specifically recognized in U.S. Pat. No. 4,254,228 issued Mar. 3, 1981 to Kleimann et al., which discloses a reaction product of a fatty acid ester and polyisocyanate included in a foamable reaction mixture containing an organic polyisocyanate, polyol and blowing agent to provide a molded product which can be removed from a mold whose surfaces have not been coated with conventional external mold-release agents. However, this method is undesirably complex or complicated in that it involves the separate or initial formation of a preformed polyisocyanate/fatty acid intermediate reaction product and the subsequent addition of same to the main foamable polyisocyanate reaction mixture, for the formation of the polyurethane in the mold. Further, the pre-reaction of the fatty acid ester with the polyisocyanate reduces the amount of reaction in the molding process and limits migration of the ester resulting in less mold release agent available at the molded surface.

As is apparent from the foregoing, the general techniques or idea of including various sorts of additives in the reaction mixture is a known technique and, as above indicated, various additives, commonly known or referred to as "internal mold release agents", have been suggested and used. However, these additives, have generally either not provided acceptable mold release properties and/or have not provided suitable surface characteristics to the molded product for binding coatings to the polyurethane. The application of coatings such as paints, varnishes and the like to the molded products is a requirement in respect to many molded products. In the past, the mold release agents, especially in the case of external mold release agents, such as silicones, have adversely affected the ability to coat molded resin products. Thus, it is highly desirable to provide a mold release agent which improves the release characteristics without adversely affecting the surface coating characteristics of the resulting molded resin article. Additionally, it would also be highly desirable to provide an effective mold release agent which, as a secondary benefit, provides improved binding of coatings to the surface of the molded product.

It is a principal object of this invention to provide an improved process for the production of molded articles from polymeric resinous materials using a glycoside compound containing one or more fatty acid ester or ether groups as a mold release agent.

It is another object of this invention to provide improved moldable resin compositions which form molded articles that are easily removed from a mold and which have improved binding properties for coatings. Still further objects and advantages of this invention will be apparent by reference to the following description.

Throughout the specification and claims all ratios and percentages are stated on a weight basis, temperatures are in degrees Celsius and pressures are in KPascals over (or under) ambient unless otherwise indicated.

SUMMARY OF THE INVENTION

In one aspect the present invention is a process for the production of molded articles from a polymeric resinous material comprising the steps of:

(a) injecting into a mold cavity a mixture which comprises a flowable polymeric resinous material and a mold release agent comprising a glycoside compound containing one or more fatty acid ester or ether groups;

(b) solidifying said mixture in said mold cavity to form said molded article; and (c) removing said molded article from said mold.

Another embodiment of this invention contemplates the use of the glycoside compound as an external mold release agent in a process for production of molded articles from a polymeric resinous material comprising the steps of:

(a) coating the interior surfaces of a mold cavity with a mold release agent comprising a glycoside compound containing one or more fatty acid ester or ether groups;

(b) injecting into said mold cavity flowable polymeric resinous material;

(c) solidifying said polymeric resinous material in said mold cavity to form said molded article; and (d) removing said molded article from said mold.

In an especially advantageous aspect, this invention is a process for preparing a reaction injection molded polyurethane product, which process comprises the steps of:

(a) injecting into a mold cavity a reactive mixture which comprises a polyol and which further comprises, per hundred parts of said polyol:

(i) 50 to 500 parts of a polyisocyanate;

(ii) 0 to 20 parts of a volatile blowing agent;

(iii) a catalyst component, and;

(iv) a mold release agent comprising a glycoside compound containing at least one fatty acid ester or ether, said mold release agent being employed in an amount ranging from 0.1 to 10 percent of the weight of said polyol.

(b) subjecting said reaction mixture in said mold cavity to temperature and pressure conditions sufficient to convert said reaction mixture to said polyurethane product; and (c) removing the resulting molded polyurethane product from the mold.

A significant and noteworthy further advantage of the present invention resides in the discovery that the above-described fatty acid ether or ester glycoside mold release agents can also function as tie coat agents to impart improved surface coating characteristics to the aforementioned molded resin compositions. Thus, in a particularly preferred embodiment the above-described polyurethane reaction injection molding process further comprises a step in which a surface coating material is applied to the resulting molded polyurethane product.

DESCRIPTION OF THE INVENTION

It has been found that improved mold release properties are achieved through the use of glycoside compound containing one or more fatty acid ester or ether groups as a mold release agent in the formation of a molded resin article. Preferably, the mold release agent is a reaction product of a glycoside and a free fatty acid, a lower alkyl ester of a fatty acid, a fatty acid halide or anhydride, a fatty glyceride, olefin oxide, long chain alkyl halide or a mixture of such reaction products. It has been found that this reaction product contains a complex mixture of esters or ethers which may include mono-, di, tri- and tetra-esters or ethers of glycoside and, when a fatty glyceride component is employed to form said reaction product, the resulting product mixture will also contain mono-, di- and tri-esters of glycerol as well as a glycerol per se.

While the indicated glycoside compounds can be quite suitably employed as external mold release agents in resin molding processes or operations, it has been found to be much preferred to employ same instead as internal mold release agents.

The glycosides suitable for use herein include those represented by the formula:

$$R(OG)_x \qquad A$$

where R is an organic residue (preferably alkyl) containing from 1 to 20 carbon atoms and G is a moiety derived from a reducing saccharide containing 5 to 6 carbon atoms. The R group may also be substituted such as with a hydroxyl group. Further the glycoside of the Formula A may include a group (e.g., ethylene oxide, polyethylene oxide, propylene oxide, polypropylene oxide, etc.) between the organic residue, R, and the saccharide moiety, G. Preferably the R group is a straight chain alkyl, having a carbon chain length of 1 to 20 and most preferably R is a lower alkyl group of from 1 to 5 carbon atoms. In an especially preferred embodiment, the glycoside is methyl glucoside. In the above-stated formula, O is an oxygen atom and provides the linkage (ordinarily formed through an acetal mechanism) between the alkanol which is the basis of the alkyl group in the preferred glycosides, and the saccharide.

Typically, the saccharides employed herein are fructose, glucose, mannose, galactose, talose, gulose, allose, altrose, idose, arabinose, xylose, lyxose and ribose.

In the above-described formula, the degree of polymerization (DP) is determined as an average value from the number represented by x. The average value of x will generally be between 1.0 and about 10 for glycosides employed in the present invention. When the average value of x is greater than 1, G may be comprised of a composite or combination of more than one type of saccharide moiety. Examples include sucrose, raffinose, stachyose, etc.

The glycosides utilized herein may be prepared according to the process described in U.S. Pat. No. 4,223,129 issued Sept. 6, 1980 to Roth et al. The source of the glycoside, however, is not crucial to the present invention; therefore, any source of the glycoside may be utilized. In addition to the basic glycosides, materials containing alkoxy groups such as ethylene or propylene oxide pendant from the saccharide may be used. Such materials are described in pending U.S. patent application Ser. No. 06/704,828 filed Feb. 22, 1985 by Roth et al.

The above-described glycoside mold release agents have also been found to impart tie coating properties to the surface of the molded resin product. More specifically, said mold release agents improve the surface characteristics of said products and thereby promote or facilitate enhanced adhesion of various coating materials thereto.

The mold release agents of this invention may be used in a wide variety of molded resin compositions. In general, such resins must be thermoplastic or thermosetting in order to perform satisfactorily. Examples of thermoplastic resins include polyamides, polyesters, polyurethanes, polypeptides, ether and acetal polymers, polysulfides, polycarbonates, polyolefins, polystyrenes, polyvinyl chlorides, acrylonitrile butadiene styrene (ABS) resins, acrylic resins, and the like. The thermoplastic resins are solidified in a mold by cooling the resin to a temperature below its solidification temperature. Examples of thermosetting resins include phenolic resins, amino resins, unsaturated polyester resins, epoxy resins, cross-linked polyurethanes, silicone polymers and similar resins. Thermosetting resins are solidified in molds via an internal crosslinking reaction.

A general embodiment of this invention is to use the glycoside compound containing one or more fatty acid ester or ether groups in sufficient amount to function as a mold release agent in the production of molded polymeric resinous articles. The glycoside component may be used as an internal mold release agent, as an external mold release agent, simultaneously as both internal and external mold release agents or as an external mold release agent in combination with coating materials.

A preferred embodiment of this invention entails the use of the mold release agent in reaction injection molded polyurethane products. In such embodiment, a process is provided in which polyurethane products are produced by reacting a mixture containing polyisocyanate, and an organic compound containing hydrogen atoms reactive with the polyisocyanate, preferably a polyol or mixture of polyols, in the presence of a catalyst and in the presence or absence of water and/or organic blowing agents, and optionally other additives.

The mold release agent of this invention is present during the above reaction and provides the basis for the internal mold release function. It is to be noted that the mold release agent is not separately reacted with the polyisocyanate component prior to the reaction injection molding operation.

The mold release agents are preferably provided, in accord with the invention, by either of two different processes, one being alcoholysis with triglyceride oils or fats (alcoholysis process, AP); and the other being alcoholysis with lower alkyl esters of fatty acids (esterification process, EP). When the AP is used for the preparation of the mold release agent, a triglyceride oil, such as soybean oil, linseed oil, palm kernel oil, sunflower oil, canola oil, coconut oil, tung oil, lard, tallow or marine oils, preferably soybean oil, coconut oil or linseed oil, is reacted with an alkyl glycoside in the presence of an alcoholysis catalyst, such as lithium carbonate, lithium hydroxide, potassium hydroxide, lithium ricinoleate, dibutyltin oxide or titanate esters until equilibrium is reached. Typically, such alcoholysis process (AP) is conducted at a temperature above about 200° C. and below about 270° C.

The molar ratio of triglyceride to alkyl glycoside in the AP reaction is typically in the range of about 1.0:0.1 to about 1.0:2.25. Preferably, the AP reaction is conducted in a fashion such that the resulting reaction product contains less than 1% glycerol. In the AP reaction, the fatty portion of the triglyceride may be saturated or unsaturated, and should have a chain length of between 6 and 24 carbon atoms, preferably between 8 and 20 carbon atoms, for best results. In some cases, the unsaturated oils are preferred since they provide liquid reaction products with low viscosities. They also provide cross-linking capabilities at the surface of the polyurethane. Further, the reaction should be controlled to provide the desired levels of mono, di, tri and tetresaters in order to obtain the best surface characteristics for the polyurethane product.

It is preferred that the predominant amount of the combined weight of the glycoside ester mold release agent components be di-,tri- and tetra esters and preferably that the monoester component constitute less than 50 percent of the glycoside ester content.

The residual free glycoside content of the AP reaction product should be 8 percent maximum, preferably less than 5 percent, and most preferably less than 2 percent. The mold release agent produced by the AP process should have a hydroxyl number of between about 19 and about 615. The molecular weight of the reaction product should be in the range of between 290 and 1380.

When the reaction product is obtained by the esterification process (EP), the fatty acid component should have a carbon chain length of between 6 and 24 carbon atoms and the fatty acid may be saturated or unsaturated, although unsaturated fatty acids are preferred as in the case of the AP reaction using triglyceride oils. The esterified glycoside should have less than 10% of free fatty acid or metallic soap, thereof. Also, the esterified product should have the desired levels of mono, di, tri and tetraesters so as to provide the desired surface characteristics.

The molar ratio of fatty acid esters to glycoside in the EP reaction mixture should be in the range of about 1:1 to about 3.5:1, preferably 1.5:1 to 2.5:1. The free glycoside content of the product should be less than 20 percent, preferably less than 5 percent, and most preferably less than 2.0 percent. The hydroxyl number of the EP reaction product should be in the range of 19 to 615.

When the mold release agent is prepared by the esterification process (EP), the reaction is typically carried out at a temperature between about 140° C. and 200° C. using potassium or sodium hydroxide or corresponding fatty soaps, thereof.

The fatty portion of the fatty acid ester or glyceride should have a chain length of between 6 and 24 carbon atoms and a degree of unsaturation, as measured by Iodine Value, between about 0 and 465 for best results.

Thus, the mold release agent can be economically prepared and effectively used in the production of molded resinous compositions having highly desired mold-release and surface coating characteristics.

When used as an internal mold release agent, the glycoside compound should be present in the molded composition at a level between about 0.1 and 10 percent, preferably about 0.5 about 5 percent, based on the weight of the resinous material.

In a preferred embodiment, the mold release agent is introduced into a mixture prepared for producing polyurethane, including an organic polyisocyanate, a polyol, a catalyst, and, optionally, a blowing agent. The mold release agent of the invention is included in an amount of between about 0.1 percent and 10 percent, preferably 1 to 5 percent, of the resinous material.

Polyols include organic compounds with a molecular weight generally between 62 and 10,000 which contain at least two hydrogen atoms capable of reacting with isocyanates. These may be compounds which contain amino groups, thio groups or carboxyl groups but are preferably organic polyhydroxyl compounds, in particular polyhydric alcohols containing 2 to 8 hydroxyl groups and especially those having a molecular weight of 800 to 10,000, preferably 1000 to 6000, e.g. the polyesters, polyethers, polythioethers, polyacetals, polycarbonates and polyester amides containing at least two, generally 2 to 8, but preferably 2 to 4 hydroxyl groups which are known per se for the production of homogeneous and cellular polyurethanes.

Additional useful polyols are described in U.S. Pat. No. 4,254,228 issued to Kleimann on Mar. 3, 1981 at Column, line 64 thru column 6, line 34, which is incorporated herein by reference.

Conventional polyurethane molding parameters, including normally employed temperatures, pressures, and the like, are used to produce the molded polyurethane containing the mold release agent. The mixture can be injected into and reacted within a mold and, at the end of the reaction, the polyurethane is readily removed from the mold. The product readily releases from the mold because of the presence of the mold release agent of the invention and can readily be coated with a variety of formulations including those based on drying oils.

EXAMPLE 1

In accord with this Example to produce an alcoholysis process (AP) mold release agent, a 1,000 milliliter, three-neck flask is provided with a mechanical stirrer and a nitrogen gas tube to provide a nitrogen gas blanket within the flask. A water-cooled condenser is provided above the flask and communicates with the flask. A thermometer is introduced into the flask and a trap is employed to collect material from the condenser. The flask is heated by means of an electric mantle.

Into the flask is introduced 720 grams of soybean oil and 274.8 grams of methyl glucoside. Lithium carbonate is added as a catalyst at a level of 2.7 grams. The reaction mixture also includes 50 milliliters of xylene which is used as a co-solvent in the reaction. The trap is also filled with xylene.

The oil is added first and heating is commenced, followed by the addition of the remaining ingredients under a nitrogen gas blanket. When the temperature reaches 240° C. there is some reflux and the nitrogen gas is cut off. The temperature of the reactants is maintained at 245°-250° C. for 75 minutes whereupon the mixture is cooled to 180° C. before being filtered. After filtering, the clear liquid solidifies on further cooling to a soft wax, the wax having a melting range of 100° to 110° C.

The mold release agent of the invention obtained above has good solubility in methanol and a Gardner color of about 13. The calculated hydroxyl number is 306.5 and by analysis is about 303.

This mold release agent is introduced into a conventional polyisocyanate mixture comprising 80.8 grams of polyisocyanate and 121.95 grams of a high molecular weight polyol, NIAX® polyol 40-34 produced by Union Carbide, and 14.44 grams of ethylene glycol. The mold release agent is employed at a level of 3.5 percent of the total resinous material in the reaction mixture.

The polyurethane is allowed to develop in a mold and, upon completion of the reaction, the product is readily released from the mold in which it is formed.

EXAMPLE 2

In accordance with this Example, the mold release agent is prepared by a two step EP process (esterification process) in which methyl esters of fatty acids are first prepared and then they are reacted with methyl glucoside. More particularly, soybean oil is reacted in methanol in the presence of sodium hydroxide, as a catalyst, at about 62° C. for 1.5 hours. Methyl soy esters and glycerol are formed, and the glycerol separates out of the reaction mixture.

The mold release agent produced by the esterification process is then made in a 5 liter, 3 neck flask equipped with a nitrogen gas connection, a mechanical stirrer having a Teflon blade, and a thermometer. A takeoff is provided which communicates with a water cooled condenser connected to an ice cooled receiver. The flask is heated by means of an electric mantle.

To the three neck flask is added 1980 grams of the methyl soy esters; 582 grams of methyl glucoside, available from A. E. Staley Manufacturing Company as STA-MEG 104; 19 grams of potassium hydroxide dissolved in 43.8 grams of methanol; and an additional 162 grams of the methyl soy ester being included to allow for potassium soap formation.

The flask and contents under a nitrogen blanket are slowly heated (52 minutes) to 140° C. and 176.7 grams of methanol is collected in the ice cooled receiver. The reaction mixture is then cooled to 108° C. with gradual application of 3 KPa vacuum to keep foaming under control. During the application of vacuum (17 minutes) the reaction mixture is reheated to 170° C. until there is no more methanol formed in the ice cooled receiver (50 minutes above 155° C.). An additional 171.1 grams of methanol is collected. The resulting mold release agent is cooled to ambient temperature. The product has a Gardner color of 14–15; a molecular weight of 750; a hydroxyl number of 167; and a Brookfield viscosity of 454 cp. There is 2.27% of unreacted methyl glucoside in the reactant product. The mono, di, tri and tetraester content is 39%, 39%, 18%, and 3%, respectively.

EXAMPLE 3

The mold release agent of Examples 1 and 2 is incorporated into an otherwise conventional, commercial polyurethane formulation, the polymerization mixture comprising the following per hundred parts high molecular weight polyol:

100 parts—high molecular weight (above about 3000) polyol, 10 to 30 parts—butane diol or other low molecular weight polyol, and an amount of polyisocyanate providing 1 to 1.05 molar equivalent of isocyanate functionality per 1 equivalent of active hydrogen in the polyols and further containing, dibutyltin dilaurate as a catalyst. The mold release agent, from Examples 1 and 2 is added at a level of 1 to 10 percent based on the total resinous material weight.

Molded polyurethane products produced from the foregoing formulation exhibit superior mold release characteristics as compared molded polyurethane products made in the absence of external mold release agents. The surface of the polyurethane exhibits improved binding of the coatings.

EXAMPLE 4

In this example, the mold release agent of Example 2 was used as an internal mold release agent in a molded article produced from bulk molding compound (BMC). The following ingredients were combined and mixed in a Hobart mixer:

| INGREDIENTS | PARTS BY WEIGHT |
|---|---|
| Resin 13031 (1) | 133 |
| Ucar LP-40A (2) | 7.5 |
| t-Butyl Perbenzoate | 1.5 |
| Mold Release Agent of Example 2 | 5.7 |
| Calcium Carbonate | 275 |
| 6.3 mm Fiberglass | 78 |
| | 500.7 |

(1) Unsaturated polyester resin supplied by U.S. Steel Corporation.
(2) Polyvinyl acetate (40%) and styrene resin (60%) supplied by Union Carbide.

The BMC mixture containing the glycoside mold release agent was cured in plates in a Carver type press at 6900 KPa pressure at 150° C. for 3 hours.

The plates containing the internal mold release agent of this invention readily released from the mold and had a more uniform appearance than a control made with an equivalent amount of zinc stearate as a mold release agent.

The plates were subjected to various physical testing procedures to evaluate their tensile and flexural properties. In Run A, zinc stearate was used as an internal mold release contact, while Run B used the mold release agent of Example 2 as the internal mold release agent. Characteristics of the plates were as follows:

| TEST | RUN A | RUN B |
|---|---|---|
| Flexural Stress ($\times 10^3$) | 64.4 Kpa | 63.9 Kpa |
| Flexural Modules ($\times 10^6$) | 17.2 Kpa | 15.5 Kpa |
| Tensile Strength ($\times 10^3$) | 23.6 Kpa | 28.1 Kpa |
| Izod Impact (Joules/m) | | |
| Notched | 224.2 | 354.4 |
| Reversed Notched | 257.3 | 362.4 |

While the subject matter hereof has been described and illustrated with reference to particular embodiments and examples thereof, such is not to be interpreted as in any way limiting the scope of the presently claimed invention.

What is claimed is:

1. A process for the production of molded articles from a polymeric resinous material comprising the steps of:
   (a) injecting into a mold cavity a mixture which comprises a flowable polymeric resinous material and a mold release agent comprising a glycoside compound containing one or more fatty acid ester or ether groups;
   (b) solidifying said mixture in said mold cavity to form said molded article;
   (c) removing said molded article from said mold cavity; and
   (d) applying a surface coating material to said molded article; said process being further characterized by the glycoside compound being present in the resinous material in an amount sufficient to provide enhanced adhesion of the surface coating material to the molded article.

2. The process of claim 1, wherein said glycoside ester or ether compound is present at about 0.1 to 10 weight percent based upon the weight of said resinous material.

3. The process of claim 1, wherein said polymeric resinous material is thermoplastic and is solidified in said mold by cooling same to a temperature below its solidification temperature.

4. The process of claim 1, wherein said polymeric resinous material is thermosetting and is solidified in said mold via an internal crosslinking reaction.

5. The process of claim 3, wherein said polymeric resinous material is a member selected from the group consisting of polyamides, polyesters, polyurethanes, polypeptides, ether and acetal polymers, polysulfides, and polycarbonates, polyolefins, polystyrenes, polyvinyl chlorides, acrylonitrile butadiene sytrene resins and acrylic resins.

6. The process of claim 4, wherein said polymeric resinous material is a member selected from the group consisting of phenolic resins, amino resins, unsaturated polyester resins, epoxy resins, cross-linked polyurethane resins, and silicone polymers.

7. The process of claim 5, wherein said polymeric resinous material comprises polyurethane.

8. The process of claim 1, wherein said fatty acid ester or ether is derived from an alkyl glycoside.

9. The process of claim 1, wherein said mold release agent comprises the reaction product of an alkyl glycoside and a fatty acid ester compound.

10. The process of claim 9, wherein said fatty acid ester compound comprises triglyceride oil.

11. The process of claim 9, wherein said fatty acid ester compound comprises a lower alkyl ester of a fatty acid.

12. The process of claim 9, wherein said fatty acid ester compound is a mixture of triglyceride oil and lower alkyl ester of a fatty acid.

13. The process of claim 10, wherein said triglyceride oil is selected from the group of soybean oil, coconut oil, linseed oil, palm oil, sunflower oil, canola oil, tung oil, lard, tallow or marine oil.

14. The process of claim 13, wherein said triglyceride oil is selected from the group consisting of soybean oil, coconut oil or linseed oil.

15. The process of claim 10, wherein said triglyceride oil is present with said alkyl glycoside in a molar ratio in the range of about 1.0:0.1 to about 1.0:2.25.

16. The process of claim 10, wherein said mold release agent contains less than 8 percent free glycoside.

17. The process of claim 10, wherein said mold release agent contains less than 5 percent free glycoside.

18. The process of claim 10, where said mold release agent contains less than 2 percent free glycoside.

19. The process of claim 11, wherein said mold release agent contains less than 20 percent free glycoside.

20. The process of claim 11, wherein said mold release agent contains less than 5 percent free glycoside.

21. The process of claim 11, wherein said mold release agent contains less than 2 percent free glycoside.

22. The process of claim 9, wherein the alkyl group of said alkyl glycoside has a carbon chain length of from one to twenty.

23. The process of claim 22, wherein the alkyl group of said alkyl glycoside has a carbon chain length of from one to five.

24. The process of claim 23, where said alkyl glycoside is methyl glucoside.

25. The process of claim 11, wherein said lower alkyl ester of a fatty acid is present with said alkyl glycoside in a molar ratio of from 1:1 to 3.5:1.

26. The process of claim 25, wherein said lower alkyl ester of a fatty acid is present with said alkyl glycoside in a molar ratio of between 1.5:1 to 2.5:1.

27. The process of claim 9, wherein said alkyl glycoside is an alkyl glycoside mixture having an average degree of polymerization of from one to about ten.

28. The process of claim 1, wherein said mold release agent has a hydroxyl number of between about 19 and about 615.

29. The process of claim 2, wherein said mold release agent is present at a level between about 1 and about 5 percent, based on the weight of the polymeric resinous material.

30. A process for producing a polyurethane product, which comprises the steps of:

(a) injecting into a mold cavity a reactive mixture which comprises a polyol and which further comprises, per hundred parts of said polyol:
  (i) 50 to 500 parts of a polyisocyanate;
  (ii) 0 to 20 parts of a volatile blowing agent;
  (iii) a catalyst component, and;
  (iv) a mold release agent comprising a glycoside compound containing at least one fatty acid ester or ether group, said mold release agent being employed in an amount ranging from 0.1 to 10 percent of the weight of said polyol;
(b) subjecting said reaction mixture in said mold cavity to temperature and pressure conditions sufficient to convert said reaction mixture to said polyurethane product;
(c) removing the resulting molded polyurethane product from the mold cavity; and
(d) applying a surface coating material to said molded polyurethane product; said process being further characterized by the glycoside compound being present in the reactive mixture in an amount sufficient to provide enhanced adhesion of the surface coating material to the molded polyurethane product.

* * * * *